(12) United States Patent
Mazzarelli et al.

(10) Patent No.: US 10,369,869 B2
(45) Date of Patent: Aug. 6, 2019

(54) UTILITY TERRAIN VEHICLE DOOR ASSEMBLY

(71) Applicant: COMMERCIAL SEWING, INC., Torrington, CT (US)

(72) Inventors: David Mazzarelli, Torrington, CT (US); Nicholas Cegelka, Naugatuck, CT (US)

(73) Assignee: COMMERCIAL SEWING, INC., Torrington, CT (US)

( * ) Notice: Subject to any disclaimer, the term of this patent is extended or adjusted under 35 U.S.C. 154(b) by 79 days.

(21) Appl. No.: 15/474,018

(22) Filed: Mar. 30, 2017

(65) Prior Publication Data

US 2017/0282696 A1     Oct. 5, 2017

Related U.S. Application Data

(60) Provisional application No. 62/316,031, filed on Mar. 31, 2016.

(51) Int. Cl.
*B60J 5/04*   (2006.01)
*B60J 1/14*   (2006.01)
*B62D 25/06*  (2006.01)

(52) U.S. Cl.
CPC ............. *B60J 1/14* (2013.01); *B60J 5/0487* (2013.01); *B62D 25/06* (2013.01); *B60Y 2200/124* (2013.01); *B60Y 2200/20* (2013.01)

(58) Field of Classification Search
CPC . B60J 5/0487; B60J 5/0473; B60J 5/06; B60J 10/86; B60J 5/047; B60J 5/0486; B60J 11/06; B60J 5/0476; B60J 11/00; B60J 5/0472; B60J 5/0491; B60J 5/062; B62D 21/183; B62D 33/0617; B62D 23/005; B62D 1/18; B62D 33/02; B62D 33/0625; B62D 25/00; B62D 25/20; B62D 63/02; B62D 65/10; B62D 25/04
USPC .......... 296/146.11, 205, 146.9, 147, 190.03, 296/100.02, 202, 63, 64, 65.12, 97.22, 296/97.8; 280/756, 781, 783, 727, 80.1;
(Continued)

(56) References Cited

U.S. PATENT DOCUMENTS 4,336,964 A  *  6/1982  Pivar .................. B60J 5/0487
                                                          180/210
6,676,193 B1 *  1/2004  Hanagan ............... B60J 5/0472
                                                          296/146.11
D511,128 S      11/2005  Nagashima
(Continued)

OTHER PUBLICATIONS

Restriction Requirement; U.S. Appl. No. 29/559,808, filed Mar. 31, 2016; Gull Wing Door; Notification Date: Jan. 10, 2017; 11 Pages.

*Primary Examiner* — D Glenn Dayoan
*Assistant Examiner* — Sunsurraye Westbrook
(74) *Attorney, Agent, or Firm* — Cantor Colburn LLP

(57) ABSTRACT

A utility terrain vehicle is provided including a vehicle body having an opening. A door is positioned adjacent a first portion of said opening. The door is configured to pivot about a first axis between an open position and a closed position. A window assembly is arranged adjacent a second portion of said opening. The window assembly is rotatable about a second axis between an open position and a closed position. In combination, the door and the window assembly substantially seal said opening of the vehicle body when said door is in said closed position and said window assembly is in said closed position.

23 Claims, 12 Drawing Sheets

(58) Field of Classification Search
USPC ....... 49/36, 40, 381, 394, 506, 501, 465, 28, 49/127
See application file for complete search history.

(56) References Cited

U.S. PATENT DOCUMENTS

| | | |
|---|---|---|
| D558,113 S | 12/2007 | Leclercq |
| D583,288 S | 12/2008 | Leclercq |
| D593,016 S | 5/2009 | Habib |
| D636,317 S | 4/2011 | Matei et al. |
| D665,321 S | 8/2012 | Huet |
| 8,794,692 B1 | 8/2014 | Burke |
| 9,919,589 B1 * | 3/2018 | Hall .......................... B60J 7/106 |
| 2007/0164066 A1 * | 7/2007 | Jones ...................... B60R 9/055 224/328 |
| 2012/0032431 A1 * | 2/2012 | King ...................... B60J 5/0487 280/756 |

\* cited by examiner

UTILITY TERRAIN VEHICLE DOOR ASSEMBLY

CROSS-REFERENCE TO RELATED APPLICATIONS

This application is related to and claims the benefit of U.S. Provisional Patent Application Ser. No. 62/316,031 filed on Mar. 31, 2016, the entire contents of which are herein incorporated by reference.

BACKGROUND

Exemplary embodiments of the present disclosure relate to a door assembly of a utility all-terrain vehicle, and more particularly, to a gull window assembly for a utility all-terrain vehicle.

Utility terrain vehicles, also referred to as UTVs, are increasing in popularity due to their versatility. UTVs may be used for many recreational and work purposes, such as trail riding, racing, cargo hauling, and transportation. UTV's typically include an open cage built around a cab for protecting the passengers in the UTV and for providing strength and maintaining the structural integrity of the UTV during a crash or rollover event. Some UTVs are manufactured to include a door mounted to the chassis to further protect the passengers in the UTV. However, these doors extend over only a portion of the height of the vehicle and therefore fail to protect passengers within the UTV not only from the elements, but also form debris that may be encountered during operation of the UTV.

SUMMARY

In one embodiment, a utility terrain vehicle is provided including a vehicle body having an opening. A door is positioned adjacent a first portion of said opening. The door is configured to pivot about a first axis between an open position and a closed position. A window assembly is arranged adjacent a second portion of said opening. The window assembly is rotatable about a second axis between an open position and a closed position. In combination, the door and the window assembly substantially seal said opening of the vehicle body when said door is in said closed position and said window assembly is in said closed position.

In another embodiment, a utility terrain vehicle includes a vehicle body including a roll cage at least partially defining an opening. A window assembly is directly coupled to a portion of said roll cage adjacent said opening. The window assembly is rotatable about an axis between a closed position and an open position.

In yet another embodiment, a method of exiting a utility terrain vehicle includes rotating a first door about a first axis from a closed position to an open position and rotating a second door about a second axis from said closed position to an open position. The first door is arranged in contact with said second door such that said first door restricts movement of said second door about said second axis.

BRIEF DESCRIPTION OF THE DRAWINGS

The foregoing and other features and advantages of embodiments are apparent from the following detailed description, taken in conjunction with the accompanying drawings, in which.

The detailed description describes exemplary embodiments, together with some of the advantages and features thereof, by way of example with reference to the drawings.

DETAILED DESCRIPTION

Figure 1:
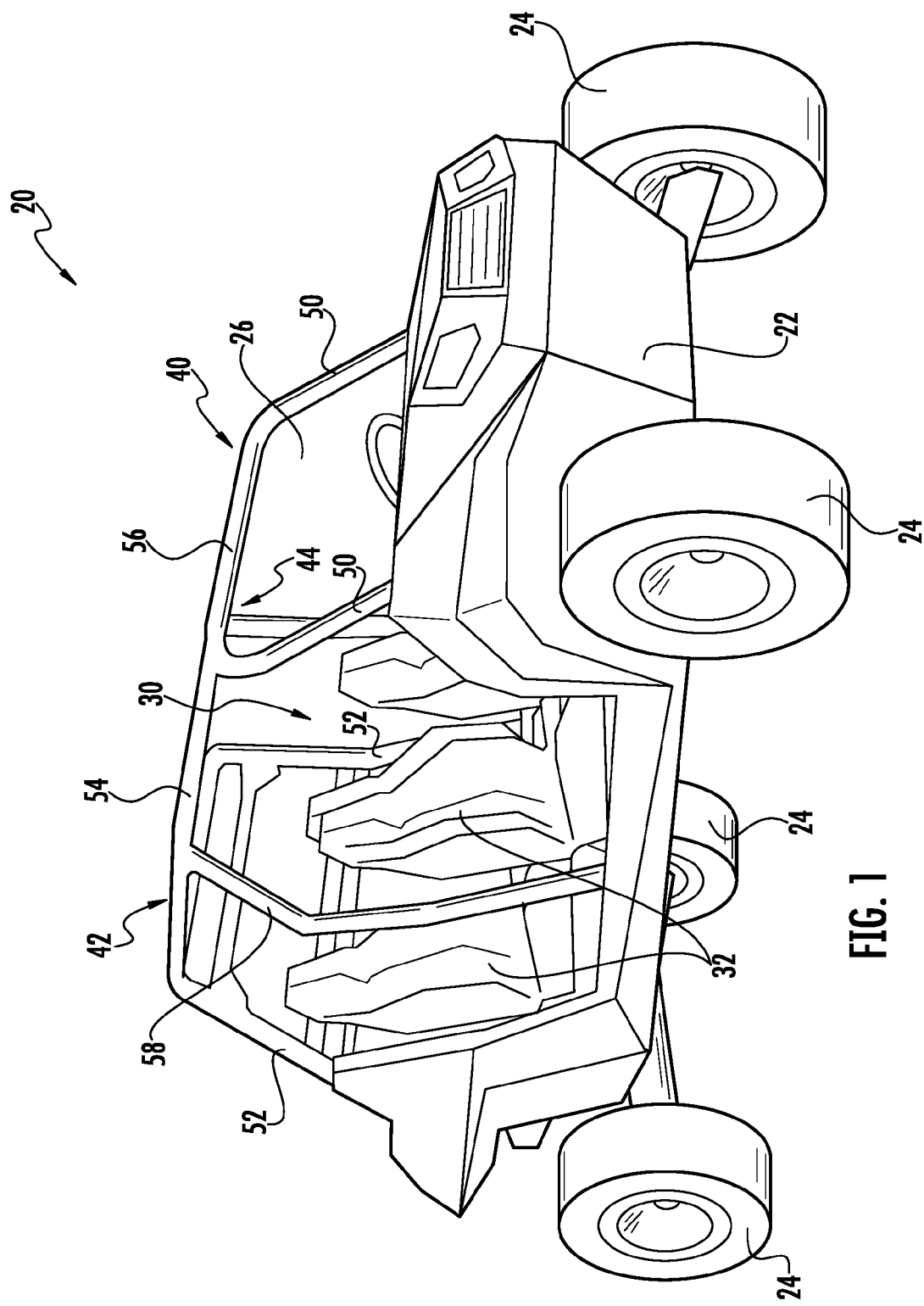
FIG. 1 is a perspective view of an example of a utility vehicle.

Referring now to the FIGS., an example of a utility all-terrain vehicle (UTV) is illustrated in FIG. 1. The UTV 20 includes a vehicle body comprising a chassis 22 supported by a plurality of ground engaging members, such as wheels including tires for example. The chassis 22 forms the body of the vehicle 20 including a front fender 24, dashboard 26, rear fender 28, and floor board (not shown). The chassis 22 similarly defines a seating area 30 within which at least one person may be seated to operate the UTV 20. In the illustrated, non-limiting embodiment of FIG. 2, the seating area 30 includes two seats 32 arranged in a side-by-side configuration. In another embodiment, illustrated in FIG. 1, the seating area 30 includes a first row containing at least one seat 32 and a second row disposed behind the first row, containing at least one seat. It should be understood, that embodiments where the seating area 30 of the UTV 20 includes any number of rows and seats are also within the scope of the disclosure. In some embodiments, the UTV 20 may include a substantially open rear cargo area 34 arranged behind the seating area 30.

The vehicle body additionally includes a roll cage 40 configured to define an interior of the UTV 20. The roll cage 40 is positioned generally adjacent to and surrounding the seating area 30. In addition, in embodiments where the UTV 20 includes a rear cargo area 34, the roll cage 40 may similarly surround at least a portion of the rear cargo area 34. The roll cage 40 is generally made from a strong, durable material, such as a metal or composite for example, and is intended to protect the passengers or cargo located therein in the event of a rollover or crash.

The roll cage 40 typically includes a similar left section 42 and right section 44 spaced apart from one another. The left and right sections 42, 44 may but need not be arranged parallel to one another. Alternatively, or in addition, the left section 42 and the right section 44 may be symmetrical about a vertically oriented plane extending longitudinally through the chassis 22 of the vehicle 20. Each of the left and right sections 42, 44 includes a front post 50 and a rear post 52 extending vertically from the chassis 22 such that an opening is defied there between. The front and rear post 50, 52 of each section 42, 44 are connected via a connecting post 54. In one embodiment, the front post 50, connecting post 54, and rear post 52 of a respective section 42, 44 of the roll cage 40 are integrally formed by bending a post, pipe, or other structural member. For added stability, one or more cross-bars 56 may extend between and couple the left and right sections 42, 44 of the roll cage 40. For example, a front cross-bar 56 may be arranged generally adjacent an upper edge of the windshield 26 and a rear cross-bar 56 may connect the rear posts 52 of the left and right sections 42, 44.

In embodiments where the UTV 20 includes multiple rows within the seating area 30 (FIG. 1) or a rear cargo area 34, an intermediate post 56, located at a position between the front and rear posts 50, 52, may be interconnected with each of the left and right sections 42, 44 of the roll cage 40. As shown in FIG. 1, the intermediate posts 56 extend vertically and couple to the connecting posts 54 to define a first portion or opening of the roll cage 40 between the front and intermediate posts 50, 56 and a second portion or opening of the roll cage 40 between the intermediate posts 56 and the rear posts 52.

Figure 2:
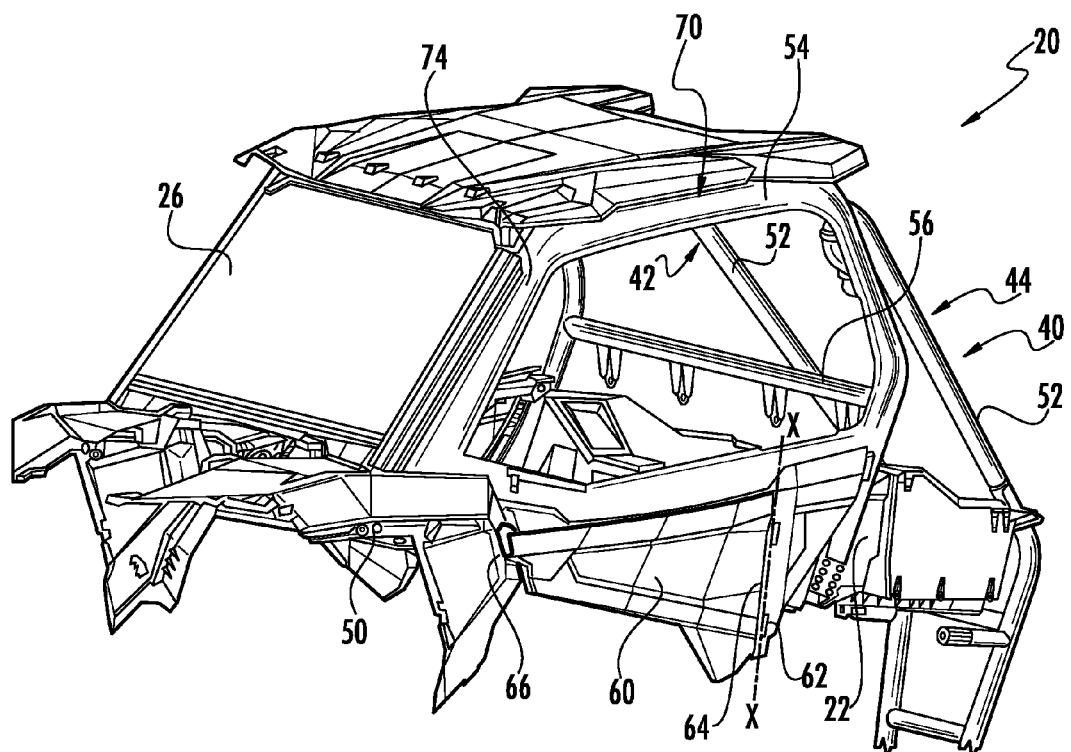
FIG. 2 is a perspective view of a utility vehicle including a window assembly according to an embodiment.
Figure 3:
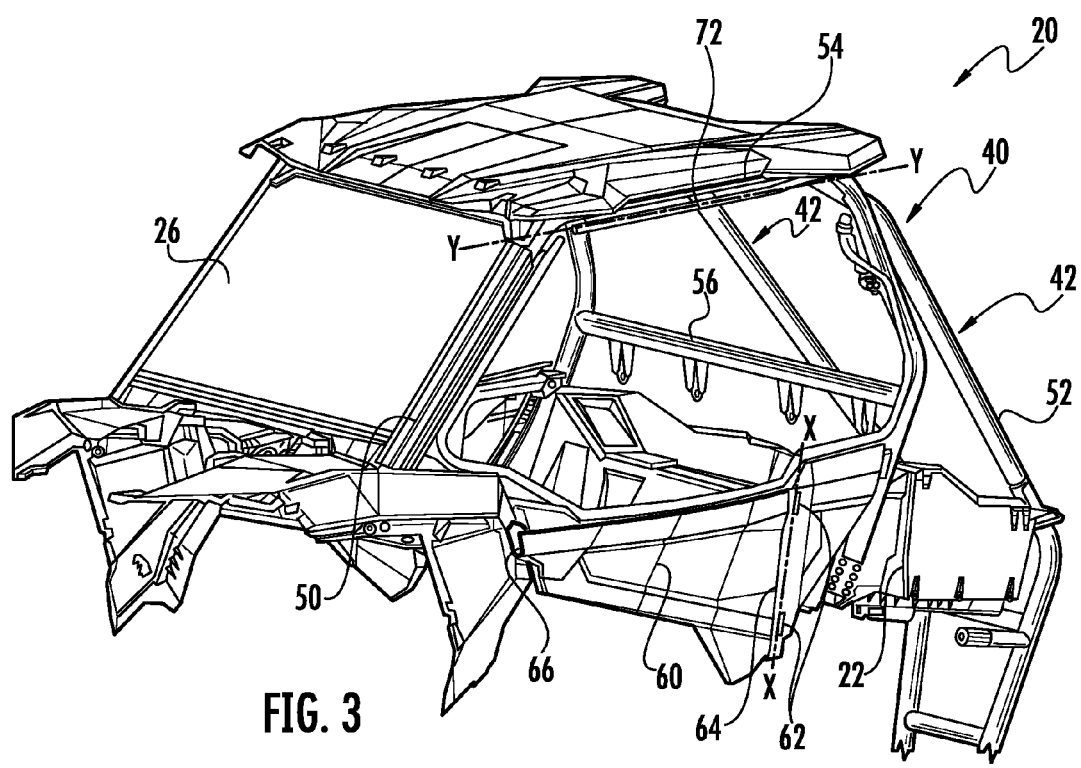
FIG. 3 is a perspective view of the utility vehicle of FIG. 2 with the covering of the window assembly removed according to an embodiment.
Figure 4:
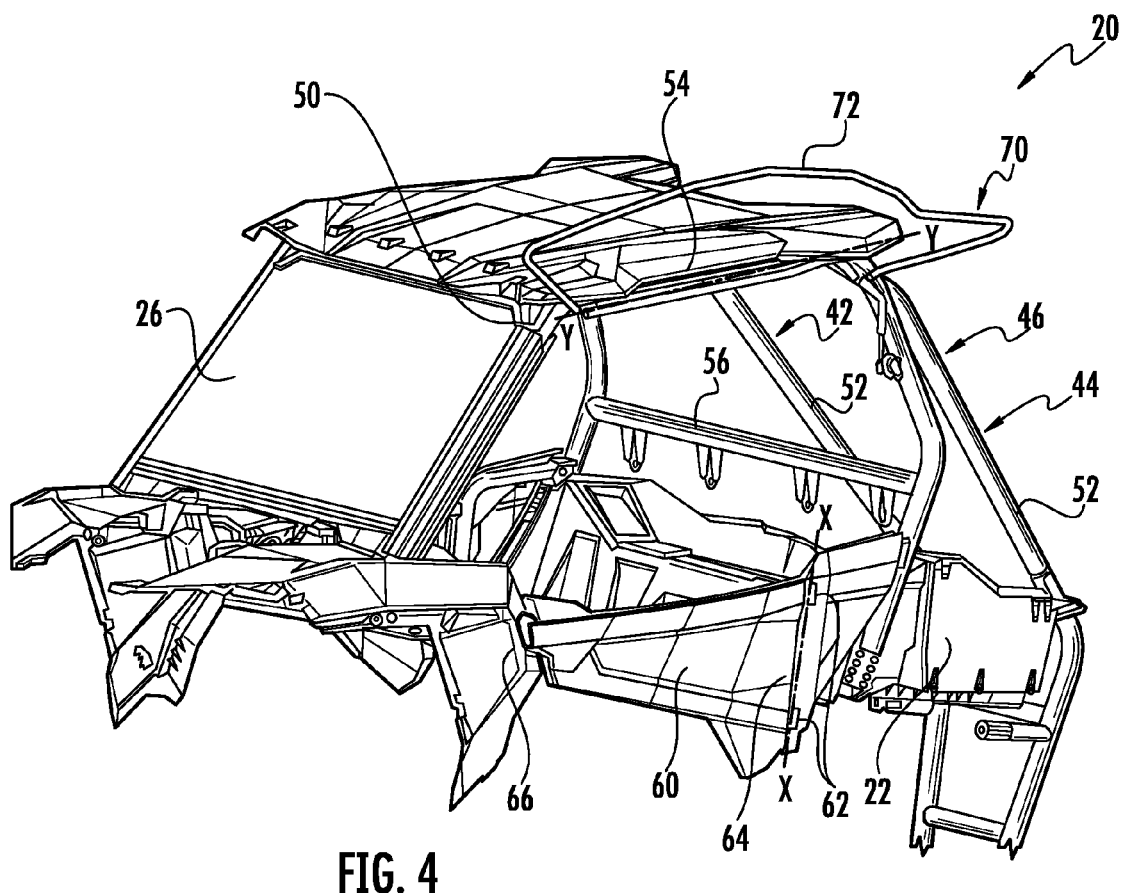
FIG. 4 is a perspective view of the utility vehicle of FIG. 3 with the window assembly in an open position according to an embodiment.
Figure 5:
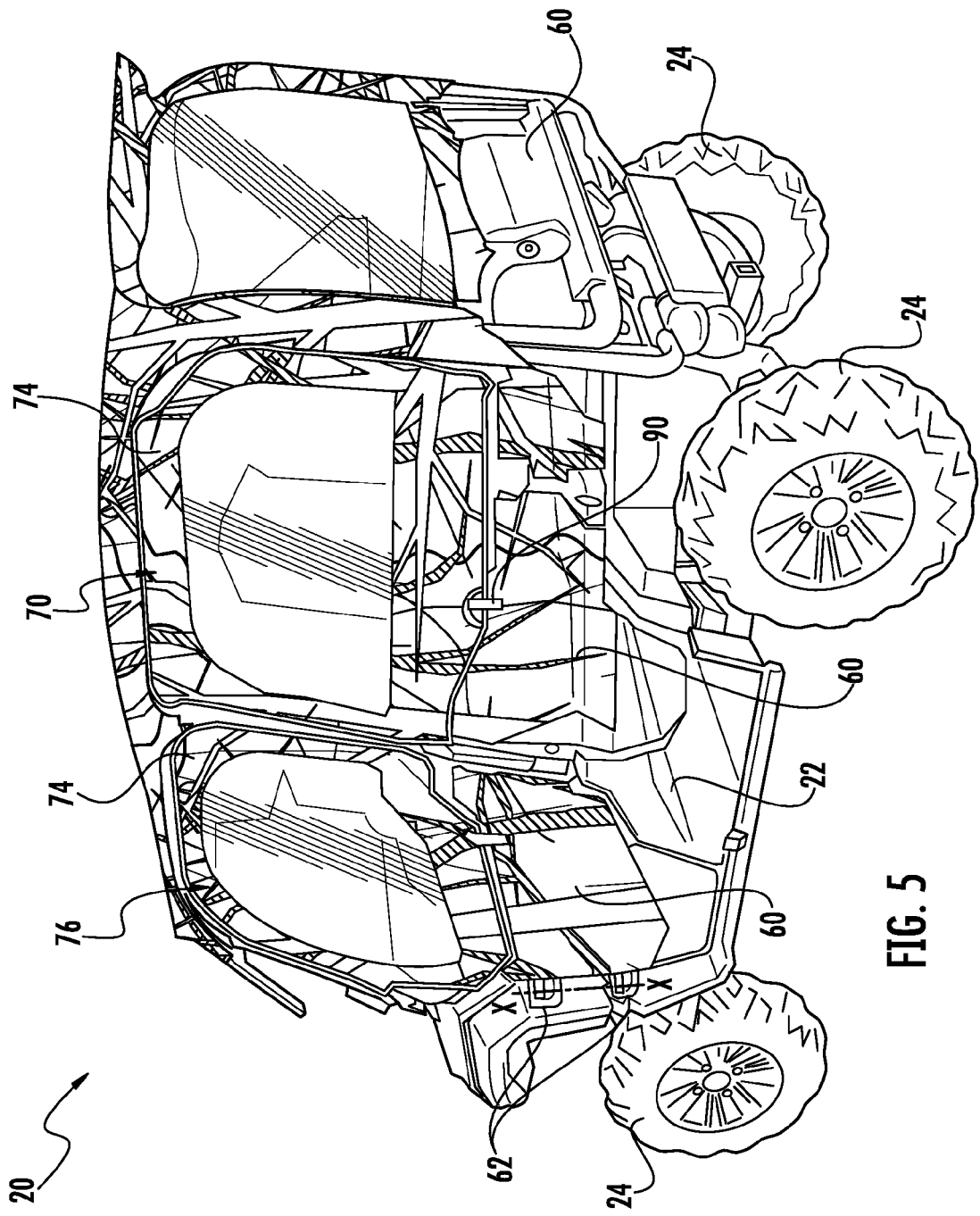
FIG. 5 is a perspective view of another example of a utility vehicle including according to an embodiment.

With reference to FIG. 2, the UTV 20 includes one or more doors 60, for example mounted to the chassis 22, which provide access to at least one of the seating area 30 and the rear cargo area 34. In one embodiment, the door 60 may be a standard component of the UTV 20 provided by the original equipment manufacturer. The door 60 has a height substantially similar to the remainder of the chassis 22 such that the door 60 selectively seals an adjacent opening. Regardless of its location, the door 60 typically includes one or more hinges 62 mounted adjacent to an edge 64 thereof such that the door 60 is pivotable about an axis X defined by the hinges 62. When the door 60 is mounted adjacent the seating area 30, the axis of rotation X may be oriented generally vertically such as within ±15° of vertical for example. In embodiments where the door 60 is mounted adjacent the rear cargo area 34, the axis of rotation X may be oriented generally vertically or generally horizontally.

A latch (not shown), for example including a rotatable pawl and detent, is mounted at an edge 66 of the door 60 opposite the hinges 62 is provided to retain the door 60 in a closed position. A handle operably coupled to the latch may be used to selectively release the door 60, thereby allowing the door 60 to pivot freely about axis X from the closed position to an open position.

Figure 6:
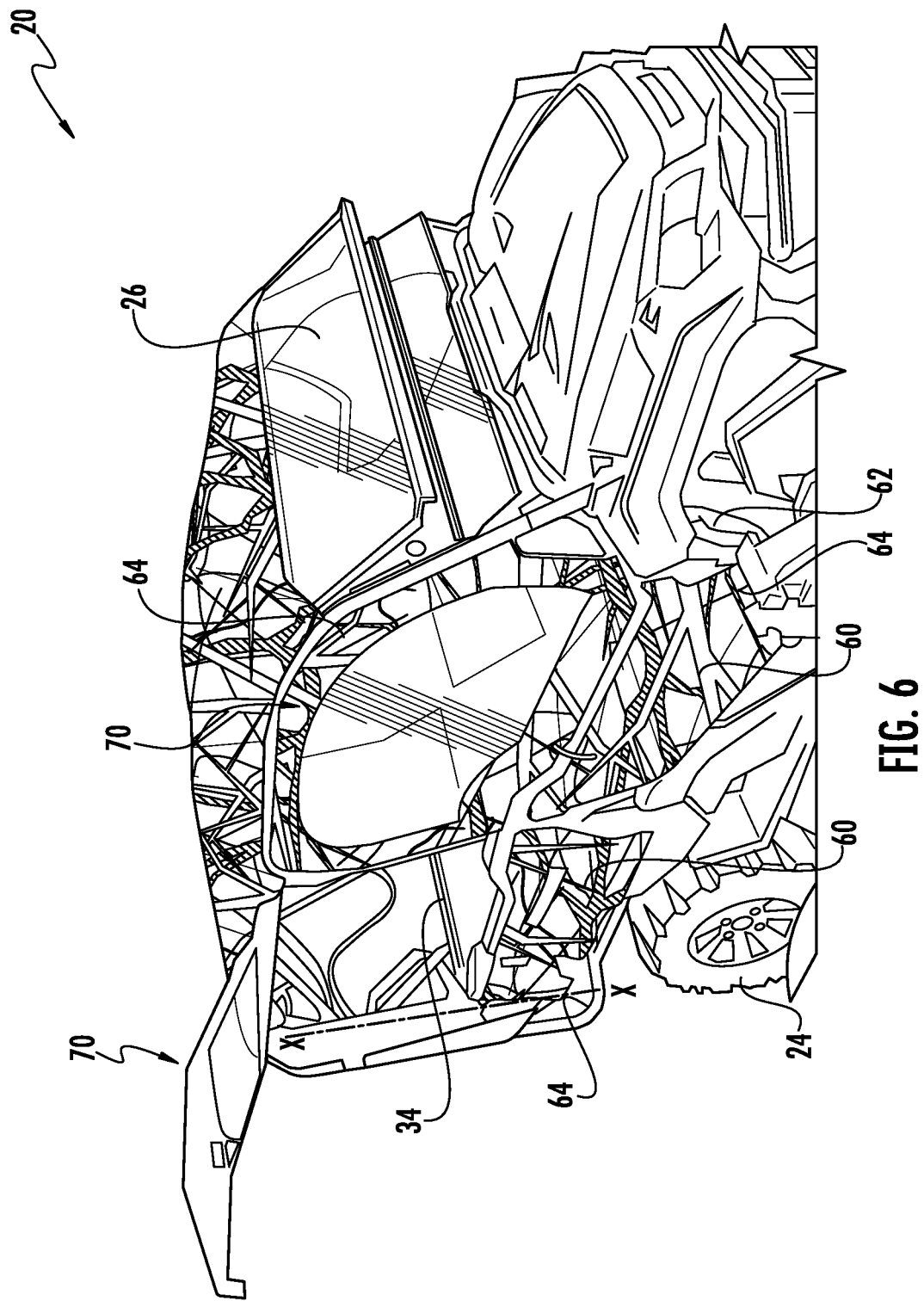
FIG. 6 is another perspective view of the utility vehicle of FIG. 5 including according to an embodiment.
Figure 7:
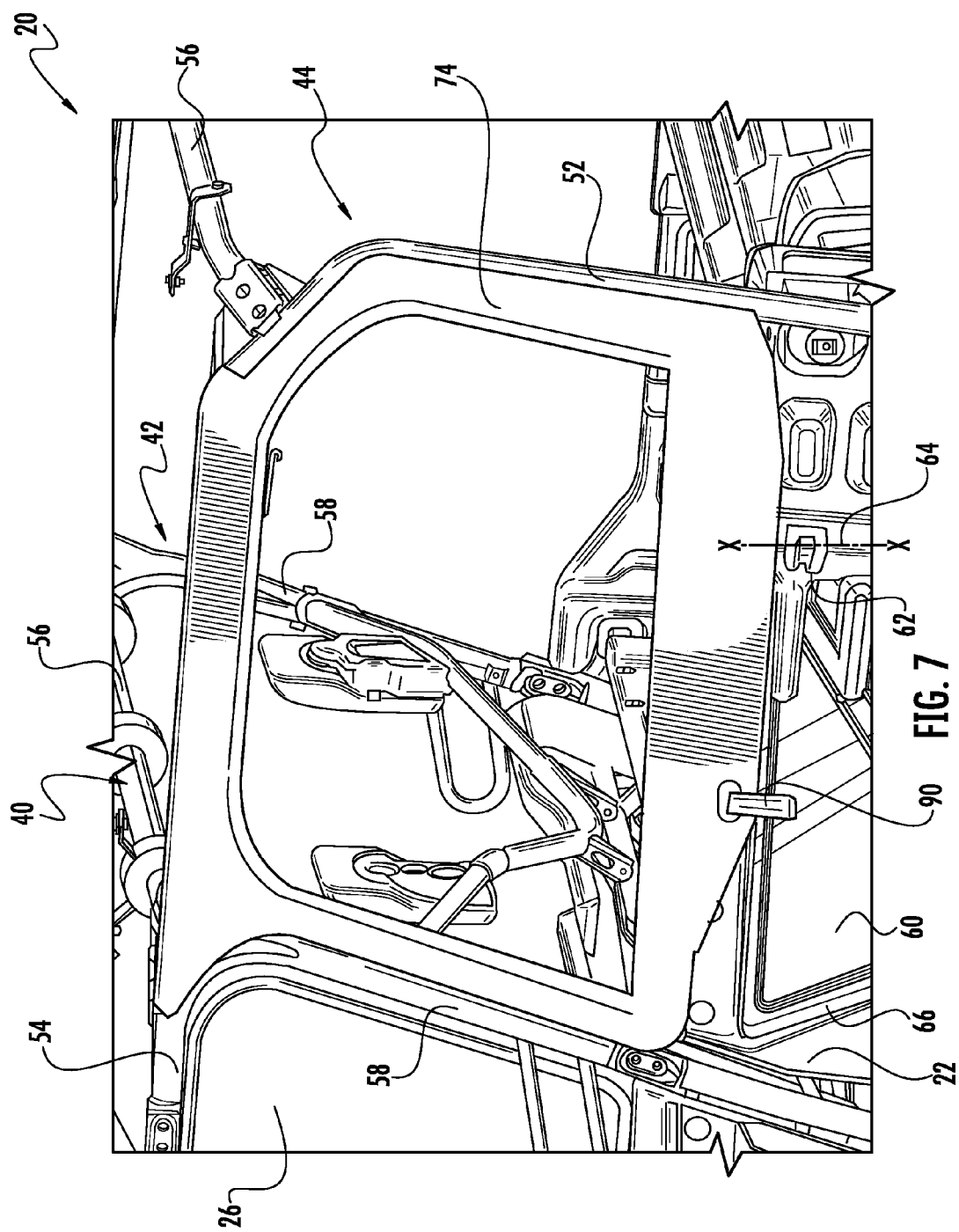
FIG. 7 is a perspective view of a window assembly mounted to a roll cage of a utility vehicle according to an embodiment.
Figure 8:
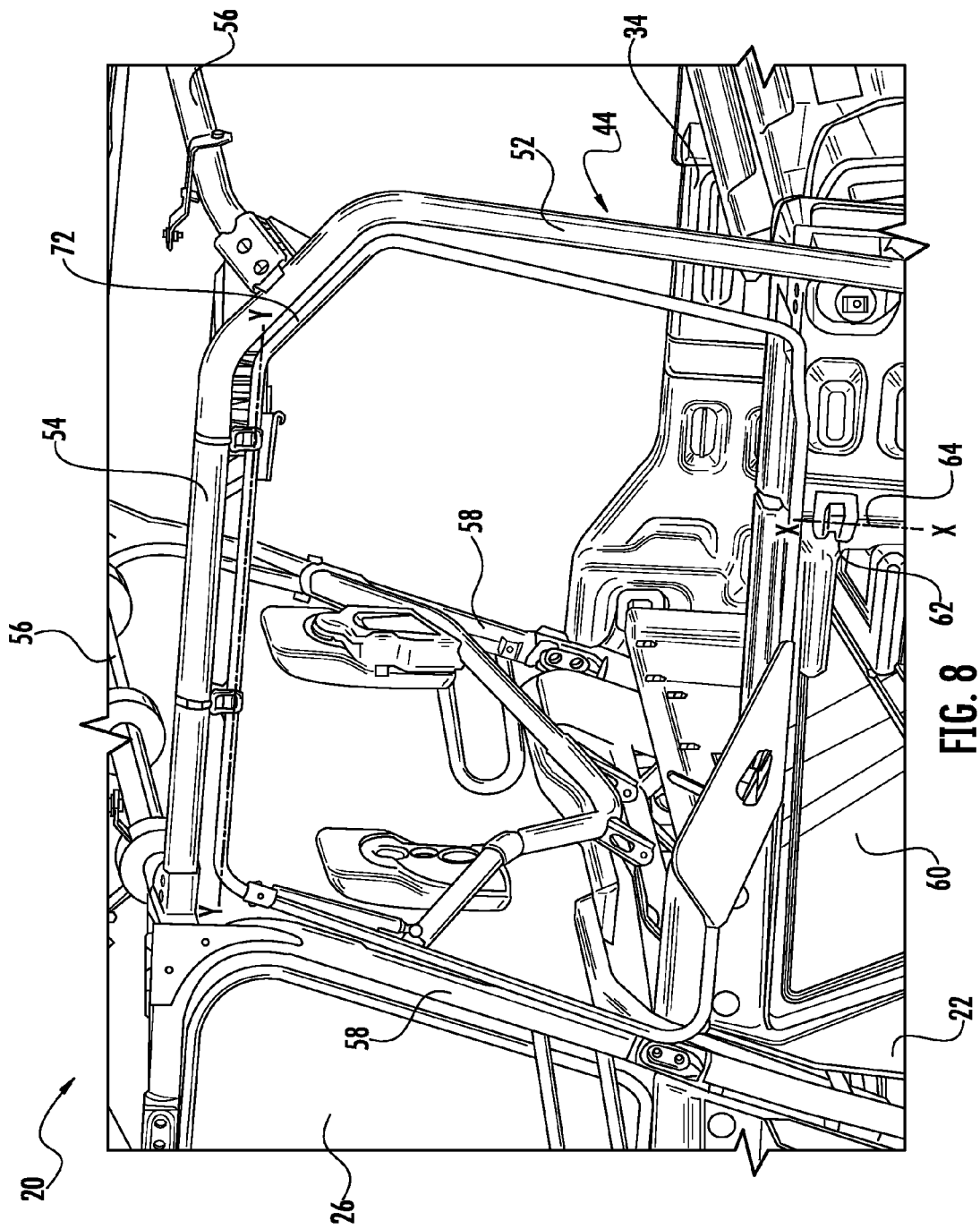
FIG. 8 is a perspective view of the window assembly of FIG. 7 with the cover removed according to an embodiment.
Figure 9:
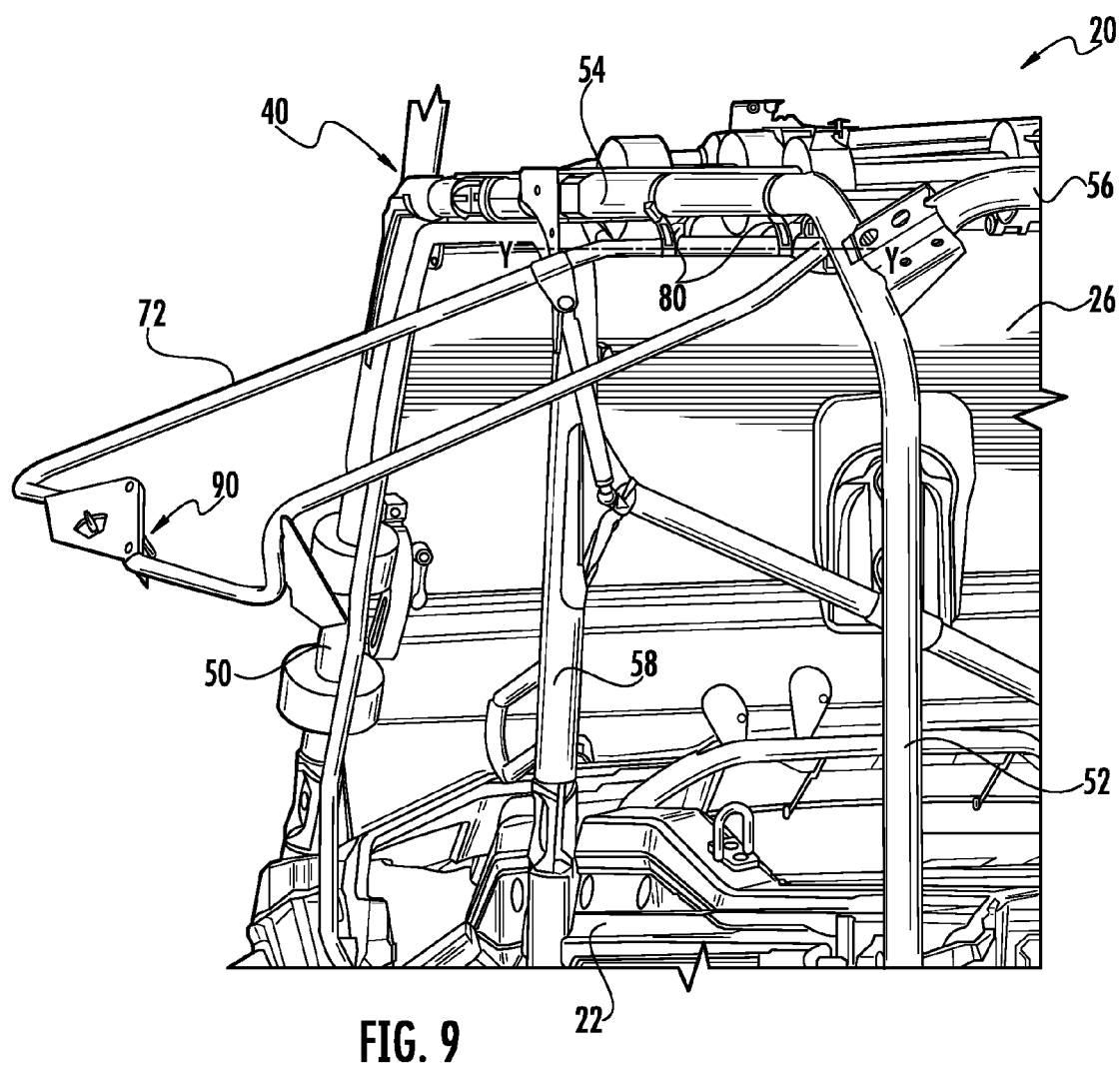
FIG. 9 is a perspective view of the window assembly of FIG. 8 in a rotated position according to an embodiment.

Because the height of the door 60 is generally complementary to the chassis 22, the door 60 only seals a lower portion of the interior area defined by the roll cage 40. Referring now to the embodiments of a UTV 20 illustrated in FIGS. 2-9, the UTV 20 includes a window assembly 70 disposed vertically above a standard door 60 to seal an upper portion of an opening in the roll cage 40. The window assembly 70 includes a frame 72 generally complementary to an adjacent portion of the roll cage 40. For example, in FIGS. 2-5, the frame 72 of the window assembly 70 has a contour similar to the front post 50, connecting post 54, and rear post 52 of a section 42, 44 of the roll cage 40. Alternatively, when the window assembly 70 is mounted adjacent a rear portion of the seating area 30, as shown in FIGS. 6-8, the frame 72 is shaped similar to the intermediate post 56, connecting post 54, and the rear post 52. When the window assembly 70 is in a closed position, a portion of the window assembly 70 may overlap with the standard door 60. A cover 74, for example including a window, is configured to surround the frame 72 to prevent rain and debris from entering the interior of the roll cage 40. The cover 74 may be formed from any suitable material, including, but not limited to fabric, plastic, glass, metal or any combination thereof.

Figure 10:
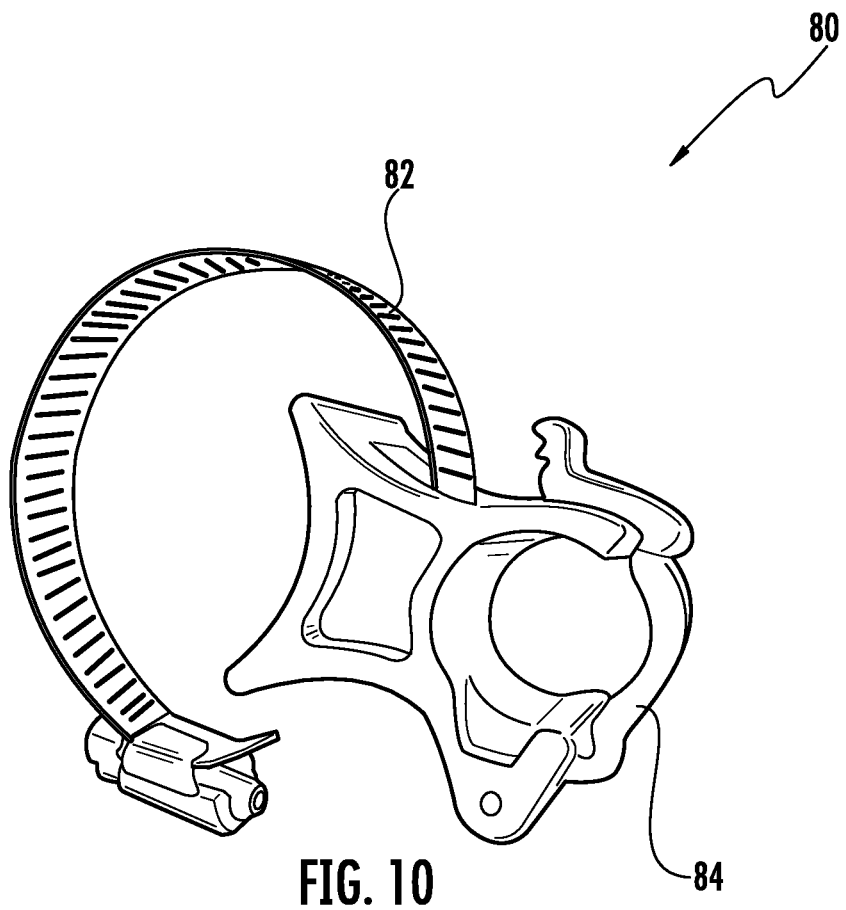
FIG. 10 is a perspective view of a coupling for connecting a window assembly to the roll cage according to an embodiment.

The window assembly 70 is configured to rotatably mount to the UTV 20. In the illustrated, non-limiting embodiment, the portion of the frame 72 extending parallel to the connecting post 54 is coupled to the connecting post 54 via one or more coupling assemblies 80. An example of a coupling assembly 80 is illustrated in more detail in FIG. 10. As shown, each coupling assembly 80 includes a first coupler 82 configured to mount about a portion of the roll cage 40, such as the connecting post 54 for example, and a second coupler 84 configured to attach to a portion of the frame 72. The first and second couplers 82, 84 are connected to one another and may be adjustable to adapt to components of various sizes. When connected to the roll cage 40, the first coupler 82 is rigidly attached to the roll cage 40 such that no relative movement between the coupling assembly 80 and the roll cage occurs 40. However, the frame 72 is configured to rotate freely within the second coupler 84 to define the rotational axis of the window assembly 70. Therefore, in the embodiment illustrated in the FIGS., the frame 72 is configured to rotate about a generally horizontal axis Y defined by the portion of the frame 72 disposed parallel to and adjacent the connecting post 54.

Figure 11:
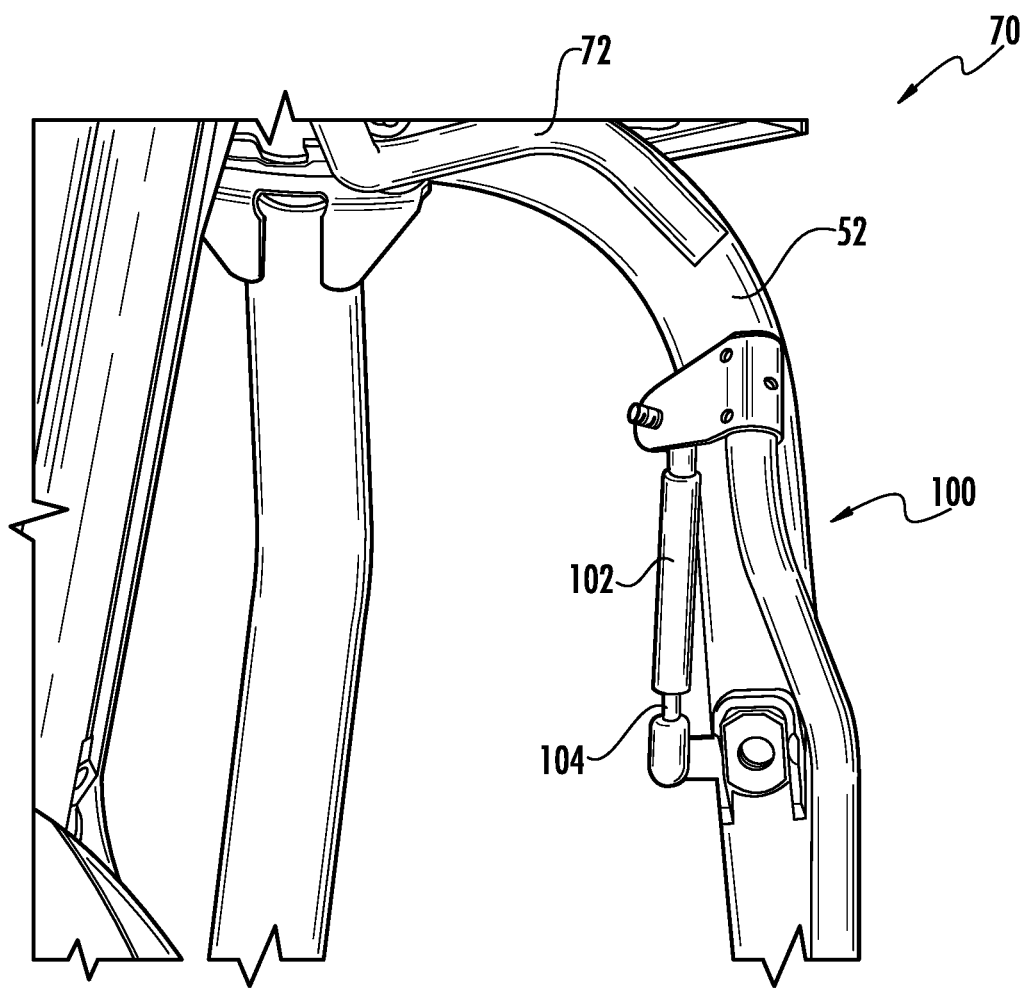
FIG. 11 is a perspective view of a mechanism for opening a window assembly when the window assembly in a closed position according to an embodiment.
Figure 12:
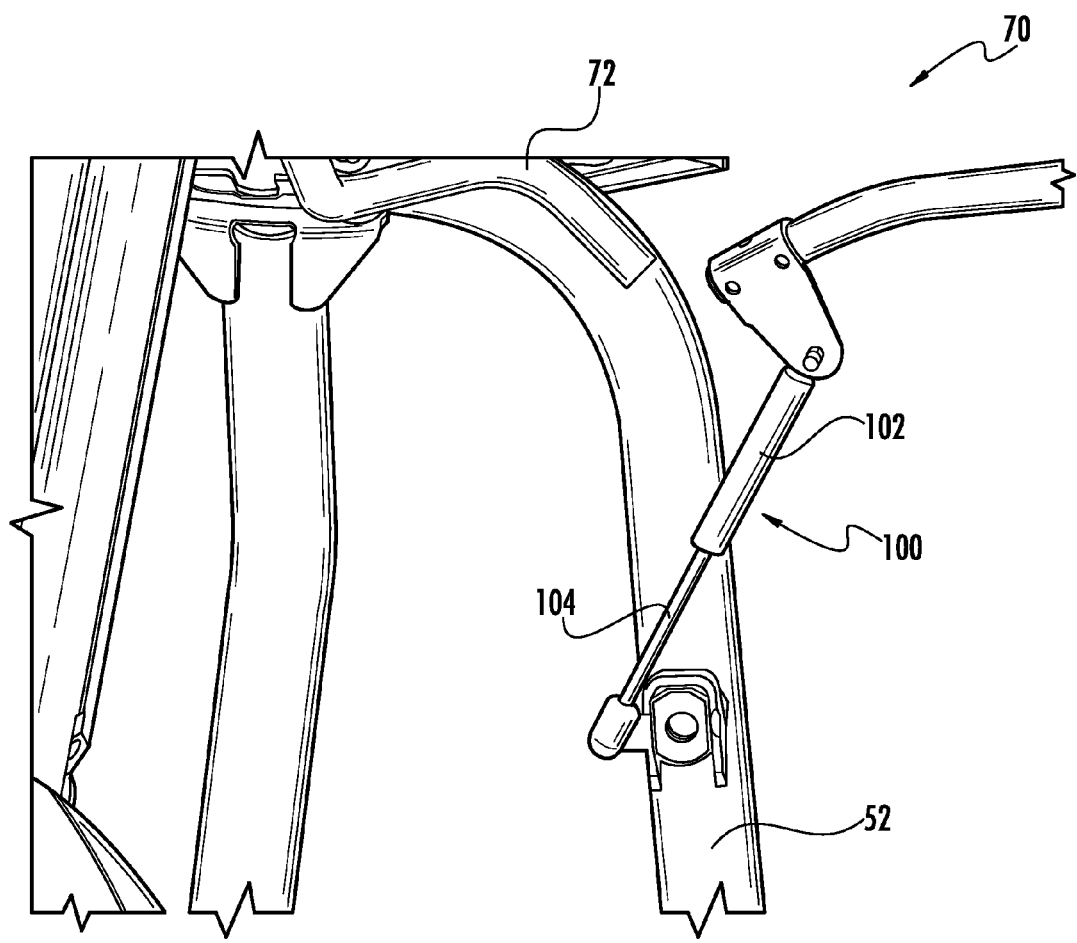
FIG. 12 is a perspective view of the mechanism of FIG. 10 when the window assembly is in an open position according to an embodiment.

With reference now to FIGS. 11 and 12, the window assembly 70 may include a movement mechanism configured to drive movement of the window assembly 70 between a closed position and an open position. In the illustrated, non-limiting embodiment, the movement mechanism includes a hydraulic or pneumatic cylinder having at least one piston therein connected to an adjacent portion of the frame 72. A fluid supplied to the cylinder is configured to drive movement of the piston within the cylinder. The movement of the piston applies a force causing the frame to rotate about its rotational axis and pivot from a closed position to an open position. Similarly, if the fluid is drained from the cylinder, the piston will slowly return to its original position, causing the door to rotate in an opposite direction about its axis from the open position to the closed position. The movement mechanism illustrated and described herein is intended as an example only and other movement mechanisms configured to slowly rotate the frame 72 about its axis Y are within the scope of the disclosure.

The window assembly 70 may similarly include a latch, such as mounted adjacent a portion of the frame 72 opposite the rotational axis Y. The latch of the window assembly 70 may be a conventional latch including a pawl and detent and may be operably coupled to at least one handle mounted to either an inside or outside surface of the window assembly 70. The latch of the window assembly 70 may be operated independently or in conjunction with the latch of the standard door. For example, in embodiments where both the standard door 60 and the window assembly 70 are in a closed position, the window assembly may be rotated open independently of the door 60. In such embodiments, when a passenger is trying to exit from the UTV 20, the passenger first rotates the window assembly 70 open, and then rotates the standard door 60 open. To close the doors, the doors are operated in reverse by first closing the standard door 60 and then the window assembly 70.

Alternatively, or in addition, for example in embodiments where the window assembly 70 overlaps a portion of the standard door 60, operation of the standard door 60 may drive rotation of the window assembly 70. For example, when both the standard door and the window assembly are in a closed position, operation of the standard door 60 may be configured to cause both the standard door 60 and the window assembly 70 to rotate to an open position.

A UTV 20 including both the standard door 60 and the window assembly 70 described herein provides a barrier for protecting an operator of the UTV 20 from debris, rain, etc. . . . .

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A utility terrain vehicle, comprising:
   a vehicle body including an opening;
   a door positioned adjacent a first portion of said opening, said door being configured to pivot about a first axis between an open position and a closed position; and
   a window assembly arranged adjacent a second portion of said opening, said window assembly being rotatable about a second axis between an open position and a closed position, wherein said door and said window rotate about said first axis and said second axis independently, and wherein said door and said window assembly combine to substantially seal said opening of the vehicle body when said door is in said closed position and said window assembly is in said closed position.
2. The utility terrain vehicle according to claim 1, wherein said first axis and said second axis are different.
3. The utility terrain vehicle according to claim 2, wherein said first axis and said second axis are arranged substantially orthogonal to one another.
4. The utility terrain vehicle according to claim 2, wherein said first axis is oriented generally vertically and said second axis is oriented substantially horizontally.
5. The utility terrain vehicle according to claim 1, wherein said window assembly is disposed vertically above said door.
6. The utility terrain vehicle according to claim 1, wherein said vehicle body includes a roll cage and said window assembly includes:
   a frame mounted to said roll cage; and
   a cover surrounding said frame.
7. The utility terrain vehicle according to claim 6, wherein said frame of said window assembly is directly coupled to a portion of said roll cage.
8. The utility terrain vehicle according to claim 1, wherein said door includes a first latch for selectively retaining said door in said closed position and said window assembly includes a second latch for selectively retaining said window assembly in said closed position.
9. The utility terrain vehicle according to claim 8, wherein said first latch and said second latch are independently operable.
10. The utility terrain vehicle according to claim 8, wherein when both said door and said window assembly are in said closed position, operation of said first latch causes both said door and said window assembly to pivot from a closed position to an open position.
11. The utility terrain vehicle according to claim 1, wherein said opening in said vehicle body is defined between a chassis and a roll cage.
12. A utility terrain vehicle, comprising:
   a vehicle body including a roll cage at least partially defining an opening, said opening including an upper area and a lower area; and
   a window assembly directly coupled to a portion of said roll cage adjacent said opening such that said window assembly extends over only said upper area of said opening, said window assembly being rotatable about an axis between a closed position and an open position.
13. The utility terrain vehicle according to claim 12, wherein said window assembly includes a frame connected to said roll cage and a cover surrounding said frame.
14. The utility terrain vehicle according to claim 13, wherein said window assembly is coupled to said roll cage with a coupling assembly, said coupling assembly including:
   an interconnected first coupler and second coupler, a portion of said roll cage being received within said first coupler and a portion of said frame being received within said second coupler, wherein said second coupler defines an axis of rotation of said frame.
15. The utility terrain vehicle according to claim 13, wherein a contour of said frame is generally complementary to an adjacent portion of said roll cage.
16. The utility terrain vehicle according to claim 13, wherein a movement mechanism is operably coupled to said frame to drive movement of said window assembly between a closed position and an open position.
17. The utility terrain vehicle according to claim 16, wherein said movement mechanism includes a cylinder having a moveable piston housed therein and movement of said piston relative to said cylinder drives rotation of said frame about its axis.
18. The utility terrain vehicle according to claim 12, further comprising a door positioned generally adjacent said window assembly and said opening, said door being rotatable about another axis, wherein together said door and said window assembly substantially seal said opening.
19. The utility terrain vehicle according to claim 18, wherein when said door and said window assembly are in a closed position, said window assembly and said door are arranged in contact with one another.
20. The utility terrain vehicle according to claim 19, wherein when said door and said window assembly are in a closed position, said window assembly overlaps a portion of said door.
21. A method of exiting a utility terrain vehicle, comprising:
   rotating a window assembly about a first axis from a closed position to an open position; and
   rotating a second door about a second axis from said closed position to an open position independently of rotating said window assembly about said first axis, said window assembly being arranged in contact with said second door such that said window assembly restricts movement of said second door about said second axis.

22. The method according to claim 21, wherein said first axis and said second axis are arranged substantially orthogonal to one another.

23. The utility terrain vehicle according to claim 22, wherein said first axis is oriented generally horizontally and said second axis is oriented substantially vertically.

* * * * *